Patented May 30, 1933

1,911,396

UNITED STATES PATENT OFFICE

BYRAMJI D. SAKLATWALLA AND HOLBERT EARL DUNN, OF CRAFTON, PENNSYLVANIA, ASSIGNORS TO SOUTHERN MINERAL PRODUCTS CORPORATION, OF NEW YORK, N. Y., A CORPORATION OF DELAWARE

PROCESS OF TREATING TITANIFEROUS ORES

No Drawing. Application filed November 29, 1932. Serial No. 644,836.

This invention relates to a process of treating titaniferous ores, and more particularly to a process of treating such ores as ilmenite in the production of titanium dioxide.

In the usual sulphuric acid process of making titanium dioxide from titaniferous ores, such as ilmenite, the ore was ground and mixed with strong sulphuric acid, the mixture was heated, and a reaction occurred in which the titanium and iron contents of the ore were converted into titanium and iron sulphates. The sulphatized ore was then leached with water to extract the soluble titanium and iron sulphates, forming what was known as a strong liquor. The strong liquor also contained other metallic impurities which had been rendered soluble by the sulphuric acid, such as compounds of vanadium, chromium, nickel, copper, manganese, and the like. This solution was then generally treated with metallic iron to convert ferric sulphate into ferrous sulphate. A part of the iron was then removed by crystallizing out ferrous sulphate. The solution which contained the titanium sulphate, together with some ferrous sulphate and various soluble metallic impurities, was then diluted, and heated so as to hydrolize the titanium sulphate and produce the precipitate which is generally referred to as basic titanic sulphate, hydrated titanic sulphate, meta-titanic acid, hydrated titanic acid, titanium dioxide, etc. The precipitate is a complex mixture containing varying proportions of titanic acid and basic titanium sulphates, and is, for convenience, usually designated as "basic titanic sulphate". The precipitate was dried and calcined to produce titanium dioxide which was used for various purposes, such as pigments.

In our process the ore is treated so as to compact its titanium content into calcium titanate and its iron into iron oxide which can be readily removed from the calcium titanate to effect separation of iron from titanium.

The preferred method of practicing our invention is as follows: The ilmenite ore is ground to a fineness of 200 mesh and is roasted with a mixture of soda ash and lime. About 60 pounds of soda ash and 30 pounds of lime are used for 100 pounds of the ilmenite ore, the temperature being maintained at about 1600° F. for approximately 3 hours. The roasting produces a mixture of calcium titanate, ferric oxide, and sodium oxide. Carbon dioxide is also liberated. The reaction may be represented by the following equation:

(1) $2FeO.TiO_2 + Na_2CO_3 + 2CaO =$
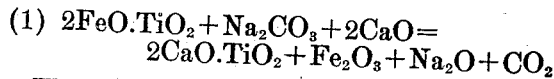
$2CaO.TiO_2 + Fe_2O_3 + Na_2O + CO_2$ The roast is leached with water to remove sodium oxide and the water soluble compounds formed by the combination of sodium with various metallic and non-metallic impurities, such as vanadium, chromium, manganese, phosphorous, aluminum, silicon, and the like. The insoluble residue present after the water leach consists essentially of calcium titanate and ferric oxide. The water leach may be represented by the following equation:

(2) $2CaO.TiO_2 + Fe_2O_3 + Na_2O + H_2O =$
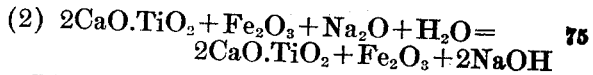
$2CaO.TiO_2 + Fe_2O_3 + 2NaOH$ The residue left after the water leach is treated with dilute sulphuric acid to convert the ferric oxide into ferric sulphate so that it can be removed. The calcium titanate is not affected by the dilute sulphuric acid and remains as an insoluble residue. The treatment with the dilute acid may be represented by the following equation:

(3) $Fe_2O_3 + 2CaO.TiO_2 + 3H_2SO_4 =$
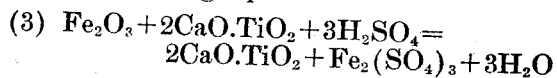
$2CaO.TiO_2 + Fe_2(SO_4)_3 + 3H_2O$ In carrying out this reaction, the dilute sulphuric acid is used in approximately 50% excess of the theoretical amount necessary to form ferric sulphate. About 136 gallons of 10% sulphuric acid are used for each 100 pounds of the water-leached residue containing calcium titanate and ferric oxide.

The insoluble residue of calcium titanate resulting from the dilute sulphuric acid treatment is filtered out and washed. The product is calcium titanate substantially free from iron and other metallic impurities. It may be sold as such for use in the ceramic or glass trades, or as a source for preparing various titanium compounds or alloys.

It may be converted into titanium dioxide by any suitable process. The preferred process consists in separating the titanium from the calcium by a sulphuric acid treatment and hydrolizing the resultant titanium sulphate solution to precipitate basic titanic sulphate. According to this process the calcium titanate is treated with concentrated sulphuric acid at a temperature of about 350° F. to convert the calcium titanate into titanium sulphate and calcium sulphate. The calcium sulphate which is insoluble is separated from the soluble titanium sulphate by filtering and washing. The titanium sulphate solution is then diluted to form a solution containing preferably about 4 to 6% $TiO_2$. This dilute solution is then hydrolized in the usual manner to precipitate basic titanic sulphate. This hydrolysis is usually carried out by heating the solution in an autoclave to a temperature of about 235° F. until the desired degree of hydrolysis is attained, usually a time of 2 or 3 hours. The basic titanic sulphate thus obtained is calcined to produce titanium dioxide.

The titanium sulphate solution obtained by the present process has a much lower content of iron and other impurities than the titanium sulphate solution produced by the old processes of treating the raw ore with sulphuric acid, and can therefore be more advantageously employed for the hydrolytic production of basic titanic sulphate. As above mentioned, when the raw ore was treated with sulphuric acid, iron and other metallic impurities were dissolved, as well as the titanium content of the ore. While a part of the iron was removed by crystallizing out ferrous sulphate, it was not practicable to reduce the iron content anywhere near as low as the iron content of the solution which we obtain from our sulphuric acid treatment of the calcium titanate. In the old process, due to the unremoved iron and other metallic impurities, the basic titanic sulphate precipitate was apt to be discolored. Moreover, in hydrolizing a solution containing the relatively large amounts of iron and other impurities it was necessary to dilute the solution to have usually not over about 2 to 3% titanium dioxide in order to minimize the precipitation of iron compounds and other impurities with the basic titanic sulphate.

The solution which is obtained by dissolving our calcium titanate in sulphuric acid has a ratio of ferrous oxide to titanium dioxide only about .08 to 1, and also has very low content of other impurities. Due to the low content of iron and other impurities, the basic titanic sulphate precipitate can be obtained of a much lighter color than in hydrolizing less pure solutions. Moreover, the greater purity of the solution permits the use of a higher titanium dioxide content in the solution, with consequent economy in handling.

A further advantage of the present process is that the end liquor or filtrate obtained by filtering the basic titanium sulphate produced by hydrolysis may be used in place of the dilute sulphuric acid as given in equation (3) for treating the water-leached roast of ferric oxide and calcium titanate.

Instead of using lime in the roasting step, we may use lime-stone or other calcareous material. While we prefer to use alkali-metal carbonates such as sodium or potassium carbonate, we may use other compounds of the alkali-metals, preferably the alkali-metal hydroxides and oxides, although other alkali-metal salts may be used, such as alkali-metal chlorides. The function of the calcium is to combine with the titanium dioxide to form calcium titanate. The alkali-metal apparently assists in opening up the ilmenite to form the calcium titanate, probably due to the formation of alkali-metal titanates as intermediate products. The presence of both the alkali-metal and the calcium seems to be requisite to secure satisfactory results.

Where the ilmenite is roasted with lime alone, only about 9% of the total iron is removed by the subsequent treatment with dilute sulphuric acid. Where the ilmenite is roasted with sodium carbonate alone, about 50% of the total iron is removed by the sulphuric acid treatment. However, when the ilmenite is roasted with both lime and sodium carbonate, about 94 to 97% of the iron is removed by the sulphuric acid treatment.

Although the preferred concentration of acid used for leaching out the iron is about 10%, this may be varied from about 5 to 20%. The function of the acid is to selectively leach out the iron without objectionably dissolving the calcium titanate. If the concentration of the acid is too high, it will dissolve too much of the calcium titanate, thereby decreasing the yield. We may use hydrochloric acid in place of sulphuric acid, although the latter is preferred since it is less expensive and has a less tendency to dissolve the calcium titanate.

Although the preferred roasting temperature is about 1600° F., this may be varied between 1500° and 1800° F. and still produce satisfactory results under some conditions. If the temperature is much below 1500° F., the reaction is not complete, whereas if it is much above 1800° there is an objectionable sintering of the product which necessitates grinding.

Instead of removing the iron oxide by the dilute sulphuric acid leach, we may remove a part or substantially all of the iron oxide by means of magnetic separation, employing the magnetic separating devices which are well-known in this art. When magnetic separation is employed, the roast is first preferably leached with water as above described, to remove the sodium oxide and other water soluble metallic and non-metallic impurities. The insoluble residue after the water leach, which is in a finely ground form, then is dried and subjected to magnetic separation. If the removal of the iron oxide by magnetic separation is not sufficiently complete, it may be supplemented by further treatment with dilute sulphuric acid, as described above, to remove remaining traces of iron.

We have described in detail the present preferred manner of practicing our process and have given certain specific proportions used in carrying out the process. It is to be understood, however, that these proportions may be varied to suit particular conditions and that the invention may be otherwise embodied or practiced within the scope of the following claims.

We claim:

1. In the process of treating titaniferous ores containing iron, the steps which comprise roasting the ore with a calcareous material and an alkali-metal compound to form calcium titanate and iron oxide, and separating the iron oxide from the calcium titanate.

2. In the process of treating titaniferous ores containing iron, the steps which comprise roasting the ore with a calcareous material and an alkali-metal compound to form calcium titanate and iron oxide, and treating the roast with a dilute acid to remove the iron oxide.

3. In the process of treating titaniferous ores containing iron, the steps which comprise roasting the ore with a calcareous material and an alkali-metal compound to form calcium titanate and iron oxide, and separating the iron oxide from the calcium titanate by magnetic separation.

4. In the process of treating titaniferous ores containing iron, the steps which comprise roasting the ore with a calcareous material and a compound of the group consisting of alkali-metal carbonates, hydroxides and oxides to form calcium titanate and iron oxide, and separating the iron oxide from the calcium titanate.

5. In the process of treating titaniferous ores containing iron, the steps which comprise roasting the ore with a calcareous material and a compound of the group consisting of alkali-metal carbonates, hydroxides and oxides to form calcium titanate and iron oxide, and treating the roast with a dilute acid to remove the iron oxide.

6. In the process of treating titaniferous ores containing iron, the steps which comprise roasting the ore with a calcareous material and an alkali-metal compound to form calcium titanate and iron oxide, leaching the roast with water to remove soluble salts formed in the roasting process, and treating the leached roast with a dilute acid to remove the iron oxide.

7. In the process of treating titaniferous ores containing iron, the steps which comprise roasting the ore with a calcareous material and an alkali-metal compound to a temperature of about 1500 to 1800° Fahrenheit to form calcium titanate and iron oxide, and separating the iron oxide from the calcium titanate.

8. In the process of treating titaniferous ores containing iron, the steps which comprise roasting the ore with a calcareous material and an alkali-metal compound to a temperature of about 1500 to 1800° Fahrenheit to form calcium titanate and iron oxide, treating the roast with dilute sulphuric acid to remove the iron oxide, and treating the calcium titanate with strong sulphuric acid to form titanium sulphate.

9. In the process of treating titaniferous ores containing iron, the steps which comprise roasting the ore with lime and sodium carbonate to form calcium titanate and ferric oxide, and separating the ferric oxide from the calcium titanate.

10. In the process of treating titaniferous ores containing iron, the steps which comprise roasting the ore with lime and sodium carbonate to form calcium titanate and ferric oxide, and treating the roast with dilute sulphuric acid to remove the ferric oxide.

11. In the process of treating titaniferous ores containing iron, the steps which comprise roasting the ore with lime and sodium carbonate to form calcium titanate and ferric oxide, leaching the roast to remove soluble salts formed in the roasting process, and treating the leached roast with dilute sulphuric acid to remove the ferric oxide.

12. In the process of treating titaniferous ores containing iron, the steps which comprise roasting the ore with lime and sodium carbonate to form calcium titanate and ferric oxide, leaching the roast to remove soluble salts formed in the roasting process, treating the leached roast with dilute sulphuric acid to remove the ferric oxide, treating the calcium titanate with concentrated sulphuric acid to form a relatively pure titanium sulphate solution, and diluting and hydrolizing the titanium sulphate solution to form basic titanic sulphate.

In testimony whereof we have hereunto set our hands.

BYRAMJI D. SAKLATWALLA.
HOLBERT EARL DUNN.